United States Patent [19]

Tripp

[11] 4,062,281

[45] Dec. 13, 1977

[54] SCRAP SHEARING MACHINE AND METHOD OF HANDLING SCRAP

[75] Inventor: Karl Heinz Tripp, Dusseldorf, Germany

[73] Assignee: Lindemann Maschinenfabrik GmbH, Dusseldorf, Germany

[21] Appl. No.: 757,683

[22] Filed: Jan. 7, 1977

[30] Foreign Application Priority Data

Jan. 21, 1976 Germany .............................. 2602043

[51] Int. Cl.$^2$ .......................... B30B 7/04; B30B 15/00
[52] U.S. Cl. ...................................... 100/35; 100/95; 100/218; 100/232; 100/233; 100/295
[58] Field of Search .................... 100/232, 233, 35, 39, 100/95, 218, 295

[56] References Cited

U.S. PATENT DOCUMENTS

| 2,675,718 | 4/1954 | Finney | 100/218 X |
| 3,039,383 | 6/1962 | Windle et al. | 100/295 X |
| 3,129,656 | 4/1964 | Judd | 100/232 X |
| 3,919,932 | 11/1975 | Basuino | 100/295 X |
| 3,945,315 | 3/1976 | Dahlem et al. | 100/232 X |

*Primary Examiner*—Philip R. Coe

*Attorney, Agent, or Firm*—Toren, McGeady and Stanger

[57] ABSTRACT

A scrap shearing machine of the type comprising shears, a feed trough for feeding scrap material to the shears, a lateral plunger disposed at one side of the trough for compacting scrap material in the trough in a direction across the trough to produce a column of scrap material in the trough and a pressing lid which is pivotally mounted at one side of the trough and has a drive by which it is movable downwards to compact scrap material downwards in the trough and is also movable upwards into an open position, has its pressing lid provided with one or more electromagnets. The electromagnets, when energized, are operative to grip the column of scrap in the trough and, when the lid is opened, to raise the column from the trough and turn the column as the lid is moved to its open position. In operation, after the column of scrap has been lifted in this way, the magnets are de-energized so that the column falls back into the trough in its turned position. This enables the column to be further compacted by the pressing lid in a direction at right angles to the downward compaction which is first effected by the lid before the column is turned.

4 Claims, 3 Drawing Figures

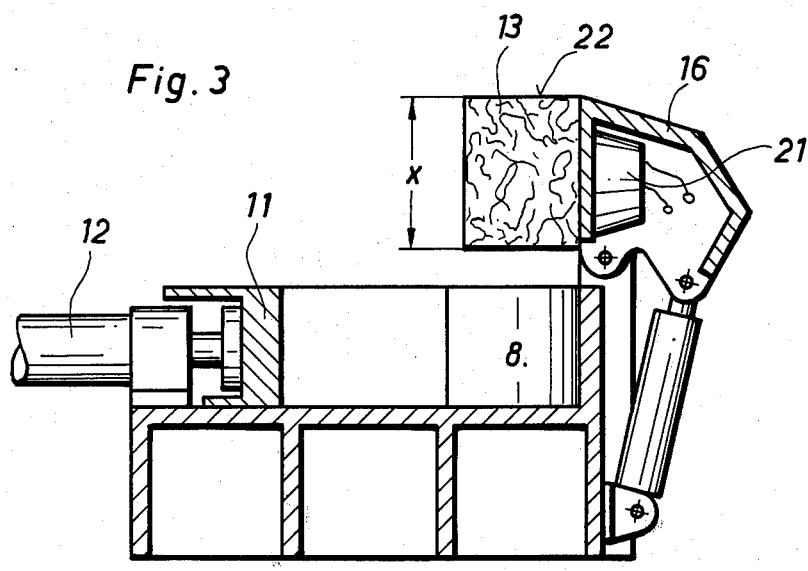

SCRAP SHEARING MACHINE AND METHOD OF HANDLING SCRAP

This invention relates to scrap shearing machines and to operational methods of such machines. It is specifically concerned with machines, and their operation, of the type comprising shears, a feed trough for feeding scrap material to the shears, a lateral plunger disposed at one side of the trough for compacting scrap material in the trough in a direction across the trough to produce a column of scrap material in the trough, and a pressing lid which is pivotally mounted at one side of the trough and has a drive by which it is movable downwards, to compact scrap material downwards in the trough, and upwards into an open position, the lid being movable through at least 90° upwards from a horizontal position.

In shearing machines of this type, the maximum width of the feed trough, that is the width when the lateral plunger is fully withdrawn, is substantially greater than the width of the shearing opening of the shears, so that the scrap material can be compacted by means of the lateral plunger and by the pressing lid to form a column of material, the width of which is then approximately equal to that of the shearing opening of the shears. In the compaction operation, it does however frequently occur that the resistance to deformation of the scrap material is so high that the force produced by the lateral plunger is not sufficient to compact the column of material to the required dimension, that is to say the lateral plunger does not reach its required final position.

In order to reduce the column of material to the required lateral dimensions to permit it to be fed through the shearing opening of the shears, the following procedure is in practice adopted:- by means of a crane and suitable lifting equipment, the compacted column of scrap material is turned or tipped laterally over in the feed trough through 90°, so that that lateral dimension of the column which has not yet been reduced to the required value can be subjected to the action of the pressing lid which has a suitably low geared driving mechanism and is thus able to produce a greater compacting force than the lateral plunger. The column is then further compacted by the closure of the lid sufficiently for its dimensions no longer to prevent it from being fed through the shearing opening of the shears.

This procedure, namely the manipulation of a long column of scrap material by means of a crane, is not only difficult on account of the need to search for a suitable attachment point for the lifting equipment and therefore extremely time consuming, but is also dangerous for the operating personnel, who must climb into the feed trough in order to attach the crane hook to the column of scrap or the lever devices. Such interruptions also have a highly detrimental effect upon the output of the shearing machine.

The aim of the present invention is to provide a scrap shearing machine of the type described above, and a method of operating such a machine, in which the above-mentioned disadvantages are overcome and, in particular, the turning of the column of scrap material is greatly simplified and speeded-up while at the same time being made much safer for the personnel operating the machine.

To this end, according to this invention, a scrap shearing machine of the type described has its pressing lid provided with one or more electromagnets, which, in operation of the machine, hold the column of scrap, when this is ferromagnetic, against the lid, so that the lid raises the column from the trough and turns the column as the lid is moved to its open position, and the lid being disposed so that by de-energising the electromagnetic or electromagnets after raising the column, the column falls back into the trough in its turned position.

The machine is operated, according to another aspect of the invention, by a method in which scrap material which is at least mainly ferromagnetic is placed in the feed trough, the lateral plunger is operated to compact the scrap material laterally to form a column of scrap material in the trough, the lid is closed to compact the scrap material in the column downwards, the electromagnet or electromagnets are energised to hold the column to the lid, the lid is moved to the open position and in so doing raises the column from the trough and turns the column about its longitudinal axis and the electromagnetic or electromagnets are de-energised so that the column is released and falls back into the trough in its turned position.

With this procedure the turning of the column can be carried out in a very short time and can be controlled, without manual intervention, from the place where the scrap shears are operated. The necessary condition for the execution of the method in accordance with the invention, namely that the scrap material shall contain sufficient ferromagnetic material, is almost always satisfied in practice.

An example of a scrap shearing machine and of a method in accordance with the invention will now be described with reference to the accompanying drawings, in which:

FIG. 3 is a section on the line III—III in FIG. 1, but showing a column of scrap material in the course of being turned over.

Figure 1:
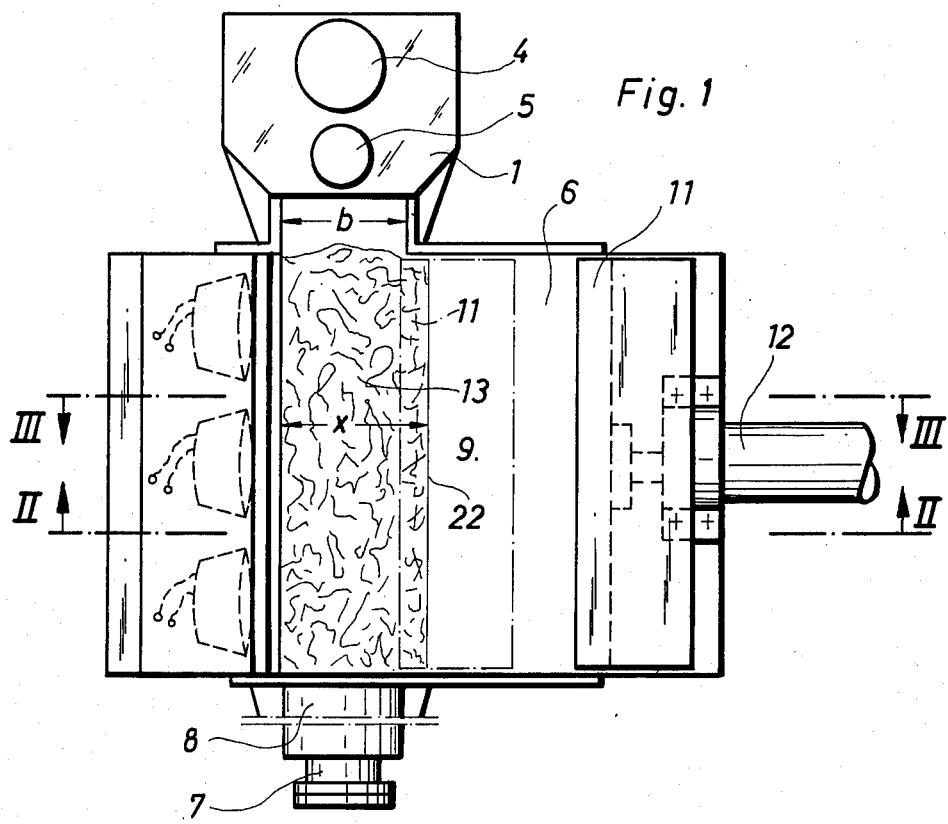
FIG. 1 is a plan of the shearing machine.

The scrap shearing machine illustrated comprises a portal-type shears frame 1, in which an upper blade support 2 and a tamper 3, which acts also as a holding-down device, are movable upwards and downwards in parallel planes and are guided in this movement, the tamper 3 on the side of the support from which the scrap is fed to the shears, that is the upstream side in the direction of scrap movement. The upper blade support 2 and the tamper 3 are operated by double-acting hydraulic rams 4 and 5, respectively. Upstream of the frame 1, the opening of which has a width $b$, is a feed trough 6. The trough 6 has a maximum width B and in it a feed plunger 8 with a hydraulic drive 7 is slidable in the direction of the longitudinal axis of the trough, that is normal to the plane of the opening of the frame 1.

Figure 2:
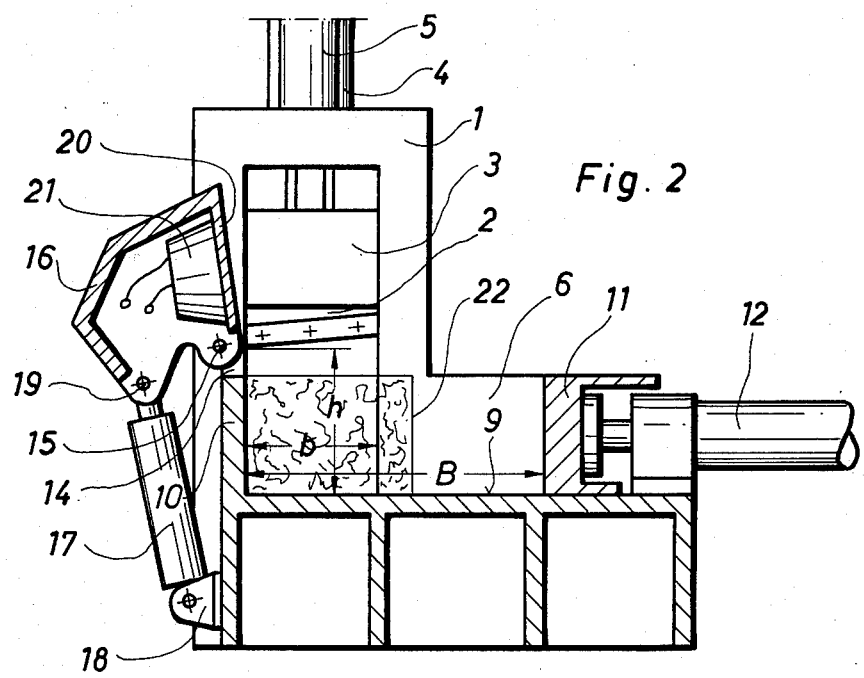
FIG. 2 is a section on the line II—II in FIG. 1.

The feed trough 6, which is open-topped, comprises as shown in FIG. 2, a supported, stationary bottom 9, a stationary side wall 10 and a movable side wall, which is opposite to the wall 10 and is formed by a plunger 11. The plunger 11 which has a double-acting, hydraulic ram drive 12, can be advanced transversely to the feed direction of the plunger 8 at least sufficiently far into the feed trough 6 to enable scrap placed in the trough to be compacted to a column of scrap 13 having a width equivalent to the width $b$ of the shears opening so that the scrap can be pushed step by step through the shears opening by operating the feed plunger 8.

A pressing lid 16, which is pivoted about an axis 15, is journalled on the upper edge 14 of the side wall 10. By means of the lid 16, the scrap can be compacted downwards at least to a height which is smaller than a height $h$ of the shears opening. The pressing lid 16 is operated by a double-acting hydraulic ram 17, the cylinder of which is attached to a stationary bracket 18 and the piston rod of which is connected by a pivot joint 19 to the pressing lid 16.

One or more, and in this example three, electromagnets 21 are mounted in the interior of the pressing lid 16, on a pressing face 20 which exerts pressure on the scrap and which for the purpose of compaction lies below the axis 15 at a height of less than $h$ from the bottom 9 when in a substantially horizontal position. As soon as the magnets 21 are energised, an electromagnetic field is produced from the pressing face 20 and this magnetic field holds to the face any ferromagnetic material situated near to the pressing face. In order to avoid any possible short-circuiting of the magnetic field through the pressing face 20 it may be advantageous for cores of the electromagnets to pass through the pressing face 20 and to be magnetically insulated from that face. The small additional complication in manufacture associated with this feature will be more than compensated by increased magnetic performance.

The shearing machine is operated as follows:-

The feed trough 6, with the lateral plunger 11 retracted, is charged with scrap material to be sheared, the scrap being at least mainly ferromagnetic. The lateral plunger 11 is then advanced and the scrap is compacted to a column 13, of a width approximately equal to the width $b$ of the shears opening. In this compacting operation, it may happen that scrap material bulges upwards beyond the height $h$ of the shears opening so that it then becomes necessary to lower the pressing lid 16 on to the column 13 of scrap, thus compacting the column downwards to the desired height. It frequently happens that the force of the hydraulic drive 12 is not sufficient to bring the lateral plunger 11 into the final position, indicated by a chain-dotted line in FIG. 1 and this means that the width of the column 13 is greater than that of the shears opening. Further processing of the column of scrap in the shears is therefore inhibited.

In such a case, the column of scrap is clamped by a magnetic force to the pressing lid 16 by energising the electromagnets 21 and, by opening the pressing lid, the column of scrap is lifted into the position shown in FIG. 3, in which it has been turned about its longitudinal axis through 90° relative to its initial position. The electromagnets are then de-energised so that the column 13 of scrap, now turned, falls back into the feed trough 6. A surface 22 of the column, previously acted upon by the lateral plunger 11 is now directed upwards, so that the pressing lid 16, which as a result of a favourable lever ratio of its drive can exert a greater surface pressure than the lateral plunger 11, can act upon the column of material in order to compact it further to the desired dimension $b$ in a direction in which the lateral plunger previously acted. This after-compaction, in which the more advantageous force transmission conditions resulting from the pivoting of the pressing lid are advantageously utilised with surprising success, ensures that in all cases the desired lateral dimensions of the column of scrap are attained, without the necessity for time-consuming interruptions and manual intervention. The after-compaction is unnecessary in those cases in which the lateral plunger is itself capable of compacting the scrap to a width $x$, which although greater than the width $b$ of the shears opening is nevertheless smaller than the height $h$ of the shears opening, because the pressing lid 16 has already compacted the column vertically to a dimension $b$ or less.

I claim:

1. In a scrap shearing machine comprising shears, a feed trough, means for feeding scrap material including a substantial proportion of ferromagnetic material in said trough longitudinally of said trough to said shears, a lateral plunger, means mounting said plunger at one side of said trough for movement laterally of said trough for compacting scrap material in said trough to produce a column of scrap material in said trough, a pressing lid, means pivotally mounting said lid at one side of said trough and drive means operatively connected to said lid to move said lid downwards to compact scrap material downwards in said trough and to move said lid upwards from said trough into an open position, said lid being movable through at least 90° upwards from a horizontal position, the improvement comprising at least one electromagnet, means mounting said electromagnet to said pressing lid and means for selectively energising and de-energising said electromagnet whereby, when said lid is moved downwards and said magnet is energised, said column of scrap is held by said magnet against said lid and movement of said lid to said open position raises said column of scrap material from said trough and turns said column about a longitudinal axis thereof into a turned position and subsequent de-energisation of said magnet causes said column to fall from said lid back into said trough in said turned position.

2. A scrap shearing machine as claimed in claim 1, wherein said pressing lid includes a pressing face member of ferromagnetic material and further comprising a core of said at least one electromagnet, means defining an opening in said pressing face member, means mounting said core extending through said opening and means magnetically insulating said core from said pressing face member.

3. A process for handling scrap material including a substantial proportion of ferromagnetic material prior to shearing said scrap material, said process comprising the steps of:
   a. depositing said scrap material in a trough;
   b. compacting said scrap material in said trough in a direction laterally of said trough to produce a column of scrap material in said trough;
   c. compacting said column of scrap material downwards in said trough by pivoting a lid of said trough downwardly against a top surface of said column;
   d. generating a magnetic field and causing said field to clamp said column against said lid;
   e. pivoting said lid upwardly through an angle of at least 90° until said lid is in an upright position and thereby raising said column which is clamped to said lid from said trough and at the same time turning said column through said angle of at least 90° about a longitudinal axis thereof into a turned position; and,
   f. de-energising said magnetic field whereby said column is released from said lid and is caused to fall back into said trough with said column in said turned position thereof.

4. A process as claimed in claim 3, further comprising the step of:
   g. pivoting said lid downwards after said column has fallen back into said trough to effect further downward compaction of said column in a direction transverse to said compaction of said column in step (c).

* * * * *